United States Patent [19]
Sasaki et al.

[11] Patent Number: 4,846,724
[45] Date of Patent: Jul. 11, 1989

[54] SHIELDED CABLE ASSEMBLY COMPRISING MEANS CAPABLE OF EFFECTIVELY REDUCING UNDESIRABLE RADIATION OF A SIGNAL TRANSMITTED THROUGH THE ASSEMBLY

[75] Inventors: Takashi Sasaki, Sendai; Yukio Hotta, Kawasaki, both of Japan

[73] Assignee: Tokin Corporation, Sendai, Japan

[21] Appl. No.: 125,998

[22] Filed: Nov. 27, 1987

[30] Foreign Application Priority Data

Nov. 29, 1986 [JP] Japan .............................. 61-182794[U]

[51] Int. Cl.$^4$ .......................................... H01R 13/658
[52] U.S. Cl. .................................................. 439/610
[58] Field of Search ................................. 439/607–610

[56] References Cited

U.S. PATENT DOCUMENTS

| | | | |
|---|---|---|---|
| 2,865,006 | 12/1958 | Sabaroff | 333/12 X |
| 3,744,128 | 7/1973 | Fisher et al. | 439/610 X |
| 4,497,533 | 2/1985 | Genova et al. | 439/610 X |
| 4,519,664 | 5/1985 | Tillotson | 439/607 |
| 4,597,624 | 7/1986 | Lax et al. | 439/610 |

OTHER PUBLICATIONS

*EMC Interface Cables TSC Series* by Tokin Corp., Tokyo, Japan, advertising brochure, Cat. No. CD-4-4EK870110P.

*Primary Examiner*—Paul Gensler
*Attorney, Agent, or Firm*—Frishauf, Holtz, Goodman & Woodward

[57] ABSTRACT

For reducing undesirable radiation of a signal, a shield cable assembly includes a cylindrical magnetic member fitted around a shielded-conductor cable to which a shielded joint is electrically and mechanically connected. An inner insulator is mounted in a connecting portion between the cable and the joint so as to support electrical contacts of the joint together with extened portions of insulated conductors of the cable, in electrical connection with one another. An electrical conductive coating is applied on the surface of the inner insulator, and is electrically connected to a cable shield of the cable. As a result, the magnetic member and the coating cooperate to reduce undesired radiation of signals from the assembly. In addition, an outer insulator encloses the inner insulator and the magnetic member, thus to connect mechanically the inner insulator with the magnetic member.

8 Claims, 2 Drawing Sheets

SHIELDED CABLE ASSEMBLY COMPRISING MEANS CAPABLE OF EFFECTIVELY REDUCING UNDESIRABLE RADIATION OF A SIGNAL TRANSMITTED THROUGH THE ASSEMBLY

BACKGROUND OF THE INVENTION (1) Field of the Invention

The present invention relates to a shielded cable assembly comprising a shielded-conductor cable and a shielded joint connected thereto.

(2) Description of the Prior Art

A conventional shielded-conductor cable comprises a set of insulated conductors and a cable shield applied over the insulated conductor set. In order to facilitate connection of the cable and another cable or an electrical apparatus, a shielded joint is mounted on a terminal end of the cable. The joint comprises a plurality of electrical contacts and a conductive shield electrically insulated from the electrical contacts. When the joint is mounted on the terminal end of the cable, the electrical contacts and the conductive shield are electrically connected to the insulated conductors and the cable shield, respectively. A combination of the cable and the joint will be referred to herein as a shielded cable assembly.

Generally speaking, an electrical signal transmitted through an electric cable comprises a plurality of frequency components over a range from a comparatively low frequency to a high frequency. During a time when the signal transmits in the cable, the signal, in particular, the high frequency components are radiated from the cable and undesirably intrude into, as noise, other electric and/or electronic apparatus disposed in the surroundings of the cable assembly.

The shielded cable assembly is useful to transmit an electrical signal between electric and/or electronic units with reduction of the undesirable radiation. This is because the insulated conductors and the contacts are covered with the cable shield and the conductive shield, respectively.

However, the cable shield must be stripped off at a connecting portion between the cable and the joint, so that the undesired radiation tends to be made from the connecting portion. Although a conventional shield joint uses a metallic shell to reduce the radiation, shield effect of the metallic shell is not so sufficient. Further, use of the metallic shell results in high cost and increased weight of the joint. It is also complex to connect the metallic shell and the cable shield.

On the other hand, it is known that the undesired radiation is effectively reduced by mounting a cylindrical magnetic member on the shielded cable adjacent the shield joint. However, it is difficult to mount such a cylindrical magnetic member onto the cable together with the shield joint.

SUMMARY OF THE INVENTION

It is, therefore, an object of the present invention to provide a shielded cable assembly which is capable of effectively reducing undesirable radiation of a transmitted signal at the connecting portion between a shielded-conductor cable and a shielded joint.

It is another object of the present invention to provide a shielded cable assembly which comprises a shielded joint containing a cylindrical magnetic member together and which is small in size, light in weight, and low in cost.

As described above, a shielded cable assembly comprises a shielded joint and a shielded-conductor cable connected to the shielded joint, the cable comprising an insulated conductor and a cable shield applied over the insulated conductor, the shielded joint comprising an electrical contact and a conductive shield surrounding the electrical contact and electrically insulated from the electrical contact, the insulated conductor and the cable shield being electrically connected to the electrical contact and the conducting shield, respectively. According to the present invention, the shielded cable assembly comprises a cylindrical magnetic member fitted around the cable, an inner insulating member supporting the electrical contact together with the insulated conductor, the inner insulating member having an outer surface, an electrical conductive coating applied on the outer surface and electrically connected to the cable shield, and an outer insulator housing enclosing the inner insulating member together with the cylindrical magnetic member to thereby mechanically connect the inner insulating member and the cylindrical magnetic member.

DESCRIPTION OF THE PREFERRED EMBODIMENT

Figure 1:
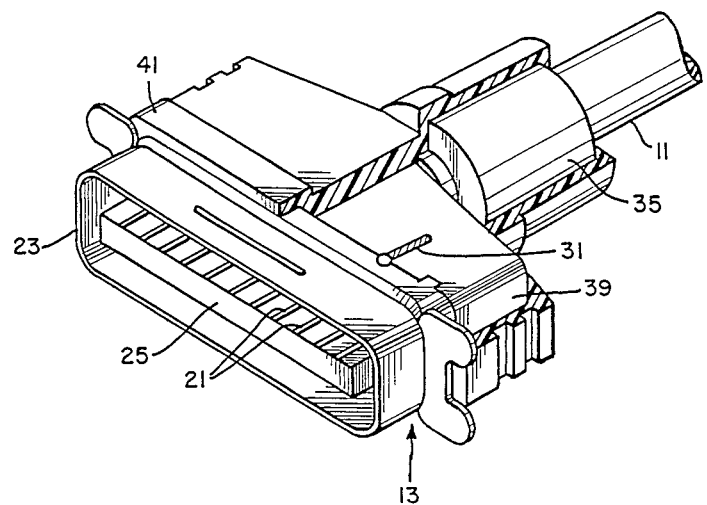
FIG. 1 is a partially exploded perspective view of a shielded cable assembly according to an embodiment of the present invention.
Figure 2:
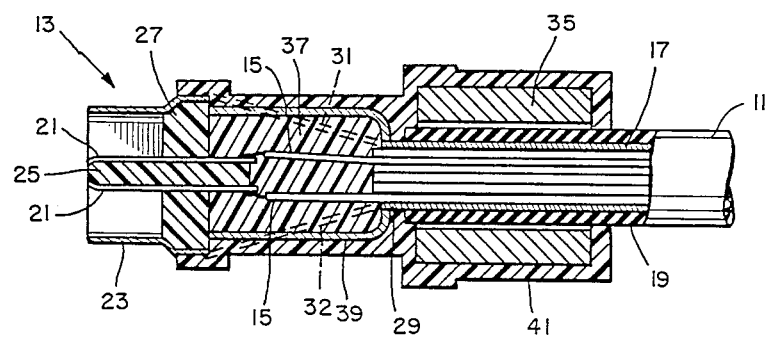
FIG. 2 is a longitudinal sectional view of the assembly shown in FIG. 1.

Referring to FIGS. 1 and 2, a shielded cable assembly according to an embodiment of this invention comprises a shielded-conductor cable 11 and a shielded joint 13 which is electrically and mechanically connected to a terminal end of the cable 11. The cable 11 comprises a set of insulated conductors 15, a cable shield 17, and an outer insulator jacket 19. Each of the insulated conductors 15 comprises a conductive core, and an insulated sheath covering the conductive core. The insulated conductors 15 extend in parallel with one another. The cable shield 17 is composed of a braided wire which is applied over the insulated conductor set in the manner known in the art. The insulator jacket 19 surrounds the cable shield 17 to protect the insulated conductors 15 and the cable shield 17.

The cable 11 has a terminal portion in which the cable shield 17 and the insulator jacket 19 are processed for connecting with the shielded joint as will later be described in detail. The remaining portion of the cable is unprocessed and may be reffered to herein as a main portion.

The joint 13 comprises a plurality of electrical contacts 21, a conductive shield 23, an insulator plate 25, and an insulator block 27. The insulator plate 25 has principal surfaces which are opposite to one another. The electrical contacts 21 are formed on the principal surfaces of insulator plate 25. The conductive shield 23 is of metal material and surrounds the insulator plate 25 with a predetermined space therebetween. The insulator block 27 is closely inserted between the conductive shield 23 and the insulator plate 25 to tightly hold the insulator plate 25. As a result, the conductive shield 23 is electrically insulated from the electrical contacts 21.

In the terminal portion of the cable 11, the insulator jacket 19 is partially cut away so as to expose a predetermined portion of the cable shield 17. The predetermined portion will hereinafter be called an exposed shield.

The exposed shield comprises a cylindrical portion 29 and first and second conductive portions 31 and 32 extending from the cylindrical portion 29. The first and second conductive portions 31 and 32 are made in the manner which will presently be described. The exposed shield is divided along a central axis of the cable 11 into two divided portions. Each of the divided portions is twisted to thereby produce each of the first and second conductive portions 31 and 32.

The first conductive portion 31 is electrically connected to a first predetermined portion of the conductive shield 23. The second conductive portion 32 is electrically connected to a second predetermined portion of the conductive shield 23. The first and the second predetermined portions may desirably be formed symmetrical with one another in relation to the central axis of the cable 11. On the other hand, the insulated conductors 15 are electrically connected to the electrical contacts 21 to define connecting portions therebetween, respectively.

The shielded cable assembly further comprises a cylindrical magnetic member or a magnetic core 35 and an inner insulating member 37. The cylindrical magnetic member 35 is of ferrite and fitted around the main portion of the cable 11. It is a matter of course that the cylindrical magnetic member 35 is mounted on the cable 11 before connecting the joint 13 thereto.

The inner insulating member 37 is of insulating material, such as a proper plastic resin, for example, polyvinyl chloride (PVC) and made to fit between the block 27 and the cylindrical portion 29 by plastic moulding so as to support the electrical contacts 21 together with the connecting portions of insulated conductors 15. The first and the second conductive portions 31 and 32 extend through the inner insulating member 37 and are led out from the inner insulating member 37 in the vicinity of the conductive shield 23.

The inner insulating member 37 has an outer surface which is covered with coating 39. The coating 39 is of electrically conductive coating material, such as a proper electroconductive paint. The electroconductive paint is applied onto the outer surface of the inner insulating member 37 by the use of a brush. Then, the paint cures and provides the conductive coating 39. The coating 39 is in contact with each of the first and the second conductive portions 31 and 32. In addition, the coating 39 is in contact with the cylindrical portion 29. As a result, the coating 39 is electrically connected to the cable shield 17. It is preferable that the coating 39 completely covers the outer surface of the inner insulating member 37.

The shielded cable assembly further comprises an outer insulator housing 41 of insulating material, such as PVC. The insulator housing 41 is made by moulding to enclose the inner insulating member 37 together with the cylindrical magnetic member 35. As a result, the inner insulating member 37 and the cylindrical magnetic mmeber 35 are mechanically connected to the cable 11 by the outer insulating housing 41.

In the arrangement of the cable assembly shown in FIGS. 1 and 2, although the connecting portions between the contacts 21 and the insulated conductors 15 are not surrounded by the cable shield 17 because the exposed end portion of the cable shield 17 is divided to form the first and second twisted conductive portions, the conductive coating 39 surrounds the connecting portions and connects with the conductive shield 23 and the cylindrical portion 29 of the cable shield 17. Therefore, the connecting portions are reliably electromagnetically shielded by the electrical coating 39. Further, the cylindrical magnetic member 35 is mounted on the shielded cable adjacent the connecting portion. Therefore, the above-mentioned undesired radiation from the joint 13 can be reliably reduced when an electrical signal transmits through the cable assembly.

Figure 3:
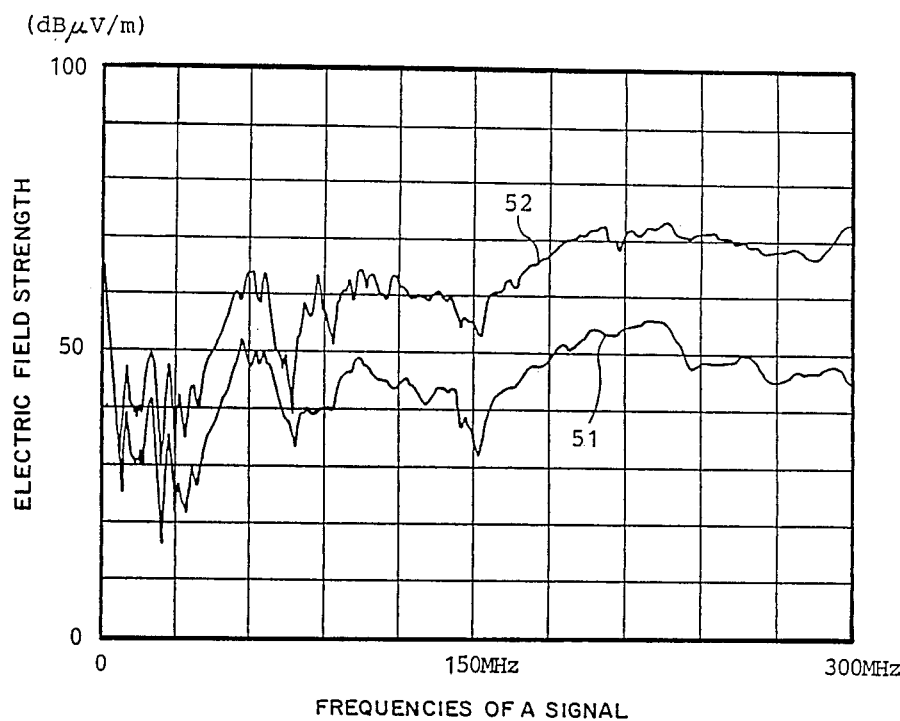
FIG. 3 is a graph for showing a radiated electric field strength to frequency response of the assembly shown in FIGS. 1 and 2 in comparison with that of a conventional cable assembly.

FIG. 3 demonstrates an electric field strength to frequency response measured in the vicinity of the shielded joint 13 while an electric signal is transmitted through the shielded cable assembly. A curve 51 represents the response of the shielded cable assembly shown in FIGS. 1 and 2, another curve 52 represents the response of a conventional shielded cable assembly using a joint with a metallic shell and without a magnetic core. As will be clear in FIG. 3, curve 51 has a level lower than that of curve 52. Accordingly, it will be understood that the shielded cable assembly according to the present invention can effectively reduce the undesired radiation in comparison with the conventional one.

While the present invention has been described in conjunction with a specific embodiment thereof, it will be possible for those skilled in the art to put this invention into practice in various other manners. For example, the exposed shield of the cable shield 17 may have only a single conductive portion in place of the first and the second conductive portions 31 and 32. In this case, the single conductive portion is twisted without dividing the exposed shield into a plurality of portions. It is also possible to divide the exposed shield into three or more conductive portions. Further, the cable shield 17 may be composed of a metallic tape which is spirally wound on the insulated conductor set in the manner known in the prior art.

What is claimed is:

1. In a shielded cable assembly comprising a shielded joint and a shielded-conductor cable connected to said shielded joint, said cable comprising an insulated conductor and a cable shield applied over said insulated conductor, said shielded joint comprising an electrical contact and a conductive shield surrounding said electrical contact and electrically insulated from said electrical contact, said insulated conductor and said cable shield being electrically connected to said electrical contact and said conductive shield, respectively, wherein the improvement comprises:

a cylindrical magnetic member fitted coaxially around said cable shield;

an inner insulating member supporting said electrical contact together with said insulated conductor, said inner insulating member having an outer surface;

an electrical conductive coating applied on said outer surface of said inner insulating member and electrically connected to said cable shield; and an outer insulator housing enclosing said inner insulating member together with said cylindrical magnetic member to mechanically connect said inner insulating member and said cylindrical magnetic member in the cable direction.

2. A shielded cable assembly as claimed in claim 1, wherein said calbe shield extends through said inner insulating member and has a particular portion led out from said inner insulating member in the vicinity of said conductive shield, said conductive coating being electrically connected to said particular portion.

3. A shielded cable assembly as claimed in claim 1, said cable shield has a cylindrical portion surrounding said insulated conductor, wherein said conductive coating is electrically connected to said cylindrical portion.

4. A shielded cable assembly as claimed in claim 1, wherein said cable shield is divided into a plurality of conductive portions, each of said conductive portions extending in said inner insulating member and electrically connected to said conductive shield.

5. A shielded cable assembly as claimed in claim 1, wherein said outer insulator housing further encloses said inner insulating member and said cable, for mechanically connecting said shielded joint to said cable.

6. A shielded cable assembly as claimed in claim 1, said cable having a main portion and a terminal portion which is extended from said main portion and on which said shielded joint is mounted on said terminal portion in electrical and mechanical connection with said cable, said cable further comprising an insulating jacket surrounding said cable shield in said main portion, wherein said cylindrical magnetic member is fitted around said insulating jacket.

7. A shielded cable assembly as claimed in claim 6, said cable shield comprising braided wires, wherein said cable shield is divided into a plurality of conductive portions each of which is twisted and electrically connected to said conductive shield.

8. In a shielded cable assembly comprising a shielded joint and a shielded-conductor cable connected to said shielded joint, said cable comprising a set of insulated conductors and a cable shield applied over said insulated conductor set, said shielded joint comprising a plurality of electrical contacts and a conductive shield surrounding, and electrically insulated from, said electrical contacts, said insulated conductors and said cable shield being electrically connected to said electrical contacts and said conductive shield, respectively, wherein the improvement comprises:

a cylindrical magnetic member fitted coaxially around said cable shield;

an inner insulating member supporting said electrical contacts together with said insulated conductors, said inner insulating member having an outer surface;

an electrical conductive coating applied on said outer surface of said inner insulating member and in contact with said cable shield; and an outer insulator housing enclosing said inner insulating member together with said cylindrical magnetic member to mechanically connect said inner insulating member and said cylindrical magnetic member in the cable direction.

* * * * *